INVENTOR.
JOHN T. CLARKE

Jan. 18, 1966   J. T. CLARKE   3,230,364
SURFACE AREA MEASUREMENTS
Filed April 11, 1963   2 Sheets-Sheet 2

INVENTOR.
JOHN T. CLARKE
BY

United States Patent Office 3,230,364
Patented Jan. 18, 1966

3,230,364
SURFACE AREA MEASUREMENTS
John T. Clarke, Stony Brook, N.Y., assignor to the United States of America as represented by the United States Atomic Energy Commission
Filed Apr. 11, 1963, Ser. No. 272,496
6 Claims. (Cl. 250—43.5)

This invention is related to a novel method and a novel apparatus for measuring the amount of gas adsorbed on the surface of a solid. More particularly this invention is related to a novel method and a novel apparatus for measuring the surface of a solid by directly measuring the number of molecules of a gas required to be present to form a monomolecular film of gas on the surface of the solid.

Accurate measurement of the surface area of the irregularly shaped solids such as powders, small rods etc. is required by many industries i.e. in fluid bed type chemical operations where a specific amount of catalyst surface area must be maintained. Surface area measurements of powders cannot be made by direct physical methods due to the complex shapes of such powders.

Previously those skilled in the art have resorted to various means and methods based upon a series of mathematical equations known as the Brunauer, Emmett, Teller (BET) equations. These methods and the underlying mathematical basis of the methods are more particularly described and clearly illustrated in the following references, an article by P. M. Emmett and S. Brunauer at pages 1558 through 1564 in vol. 59 of the Journal of the American Chemical Society and in articles by P. M. Emmett in his book entitled "Catalysis" vol. I, Fundamental Principles Part I, published by the Rheinhold Publishing Company, 1954, at pages 36 through 42 and pages 90 through 117. Fundamentally the methods previously used in the art employing the BET equations to calculate the surface area of solids required the adsorption of a monomolecular film of gas having known molecular dimensions onto a solid determining the number of the molecules of the gas making up the film and multiplying this number times the average area each molecule would occupy when adsorbed on the solid. This average area depends on the molecular diameters used in the calculation and such diameters are well known for many gases. In the prior art the gas most often used was nitrogen.

The low temperature physical adsorption of nitrogen on a sample is currently the most widely used method of determining surface areas of solids. In carrying out these measurements, a known amount of sample is placed in an enclosed chamber, the chamber's outer surface is immersed in liquid nitrogen and measured volumes of nitrogen are introduced into the chamber. The nitrogen in the chamber is allowed to reach a point of adsorption equilibrium with the sample and the pressure of the nitrogen not adsorbed in the chamber is then measured. Additional incremental metered amounts of nitrogen are added to the sample cell and the equilibrium pressure for each incremental addition is then measured. The amount of nitrogen adsorbed on the surface for any incremental addition of nitrogen to the container is determined by calculating the difference between the amount metered into the system and the amount left not adsorbed in the container. This latter amount is determined by pressure, volume and temperature measurements. A graph is then made of the amount of nitrogen adsorbed versus $P/P_o$ i.e. the equilibrium nitrogen pressure divided by the pressure of the nitrogen at the liquid nitrogen temperature. From this graph it is seen that the slope of the ml. of nitrogen adsorbed divided by $P/P_o$ approaches 0 (or a constant) when $P/P_o$ is in the range of 0.002 to 0.20. The amount of nitrogen adsorbed when the slope becomes 0 (or constant) represents that point at which a monolayer of nitrogen is adsorbed on the surface of the sample and each ml. of nitrogen (CTP) adsorbed corresponds to 4.37 $M.^2$ of surface. From the weight of the sample the surface area per gram can readily be calculated. Obviously such a method has many drawbacks such as the fact that only one sample can be measured in the system at one time since the amount of gas forming the film on the surface of the solid is indirectly obtained as the difference between the amount of gas introduced into the system and the amount of gas remaining unadsorbed in the system. Further it required careful measuring of the inflow of gas into the system, accurate temperature volume and pressure measurements throughout the system to minimize errors. Very elaborate apparatus is required to make these measurements and the system is ineffectual in measuring solids having surface areas less than 1 square meter per gram.

It is an object of this invention to provide the art with a simple method and apparatus for ascertaining the amount of gas adsorbed on the surface of a solid when the gas and solid are brought into contact with each other.

Another object of this invention is to provide the art with a simple and accurate method and apparatus for measuring the surface area of solids.

Another object of this invention is to provide the art with an apparatus and method of correctly measuring the number of molecules which are adsorbed on the surface of a solid.

Other objects of this invention will in part be obvious and will in part be disclosed hereinafter.

I have discovered that the number of molecules of gas adsorbed on a solid can readily be ascertained by adsorbing a gamma ray emitting gas on the solid and radiolytically measuring the amount of gas actually adsorbed on the surface of the solid. As a direct result of my discovery one is able to more easily calculate the number of molecules required to be adsorbed on the surface of a solid to form a monomolecular film thereon.

I have discovered that the surface areas of solids can readily be ascertained simply by placing a solid in a closed chamber, introducing sequentially into the chamber in one or more increments a gamma ray emitting gas which gas is inert with respect to and adsorbable on the surface of the solid, allowing the gas contained in each incremental introduction to reach the point of adsorption equilibrium with the surface of the solid while maintaining the temperature of said solid and gas adsorbed on the surface of said solid at a temperature such that the normal vapor pressure of the gas in the system is less than one atmosphere; thereafter measuring the pressure of the unadsorbed gas in the chamber and radiolytically measuring the amount of gas adsorbed on the surface of the solid after each incremental introduction of gas has reached the point of adsorption equilibrium with the solid; and thereafter calculating the number of molecules of the gas that would be required to form a monomolecular film of the gas on the surface of the solid by utilizing the data obtained from my novel method together with the BET equations which are known to those skilled in the art and referred to above to ascertain the surface area of the solid.

In the preferred embodiment of my invention I utilize krypton gas containing measurable trace amounts of the gamma ray emitting krypton 85 isotope. I have also found xenon gas containing trace amounts of a gamma ray emitting xenon isotope to be usable in my invention. Of course any gamma ray emitting gas whose pressure may be thermally regulated such that its normal pressure in the system may be maintained below one atmosphere upon adsorption of a monomolecular film on the sample whose surface area is to be measured, may be used in my invention, providing it is chemically inert with regard to the solid unto which it is being adsorbed and which gas is adsorbable on the surface of the solid. A gamma ray emitting gas must be used rather than a beta ray emitting gas in order to avoid the self shielding effects present in the solid which would prevent accurate measurement of the quantity of gas adsorbed on the surface of the solid by beta ray measurement. Of course gases such as the krypton 85 isotope which emit both beta and gamma rays can be utilized provided that all necessary radiolytic quantitative measurements are based solely on the degree and amount of gamma ray emission.

By the term radiolytic measurement as used in this invention I mean measurement of the amount and degree of gamma ray emission emanating from the gas adsorbed onto the solid in order to ascertain the actual quantitative amount of gas actually adsorbed on the solid. Of course it is to be understood that such measurements require that the gas not only have a measurable amount of radiation but also that the radioactive half life be of sufficient length to permit accurate measurements to be made. The use of krypton gas containing trace radiolytically measurable amounts of krypton 85 eliminates the need for use of such dimensional corrections and the krypton 85 isotope has sufficient half life to permit accurate measurements to be made within time intervals of sufficient length without requiring decay factor corrections.

The actual amount of gas to be adsorbed on the surface of the solid and the number of increments of gas to be adsorbed on the surface of the solid is discretionary with the user of my novel method. In general, it is preferred that more than two and in the preferred embodiment of my invention at least five increments of gas be adsorbed on the surface of the solid and that pressure and radiolytic measurements be taken after each increment has been adsorbed on the surface of the solid. In the preferred embodiment of my invention I adsorb at least one increment which is in an amount that is less than the amount necessary to form a monomolecular film on the surface of the solid and at least another increment which together with the first increment adsorbs an amount which is more than the amount required to form a monomolecular film on the surface of the solid. Since the data gained from the use of my novel method is plotted on a graph to form a line the slope of which provides us with the number of molecules required to form a monomolecular film it is best to have as many points as possible in order to ascertain that experimental error does not invalidate the results obtained. Of course when my novel process is employed when materials having a known affinity for the gas used and thus a known intercept on a B.E.T. equation plot for the solid being measured, all that is needed to be adsorbed on the sample is one incremental addition of the gamma emitting gas, to ascertain the surface area of the solid being measured.

Temperature is not a limiting factor in the practice of my invention. However, in order to eliminate the necessity of making involved corrections for gamma radiation emanating from gas contained in the gas phase surrounding the solid it is preferred to operate my invention at temperatures ranging considerably below the boiling point of the gas but above the temperature where it has sufficient vapor pressure to enable the gas to be readily adsorbed on the surface of the solid. Such a temperature range varies according to the gas employed and in the preferred embodiment of my invention when krypton gas is used I utilize temperatures ranging from about 70° K. to about 90° K.

The solid upon which the gas is to be adsorbed can be in any state ranging from a fine powder to coarse granules. Its shape can be in the shape of rods, crystals etc. My invention is not limited in scope by the shape or form of the solid. In the case of materials containing high gamma adsorbing materials the sample should be geometrically shaped to minimize the self-adsorption of such a material.

Figure 1:
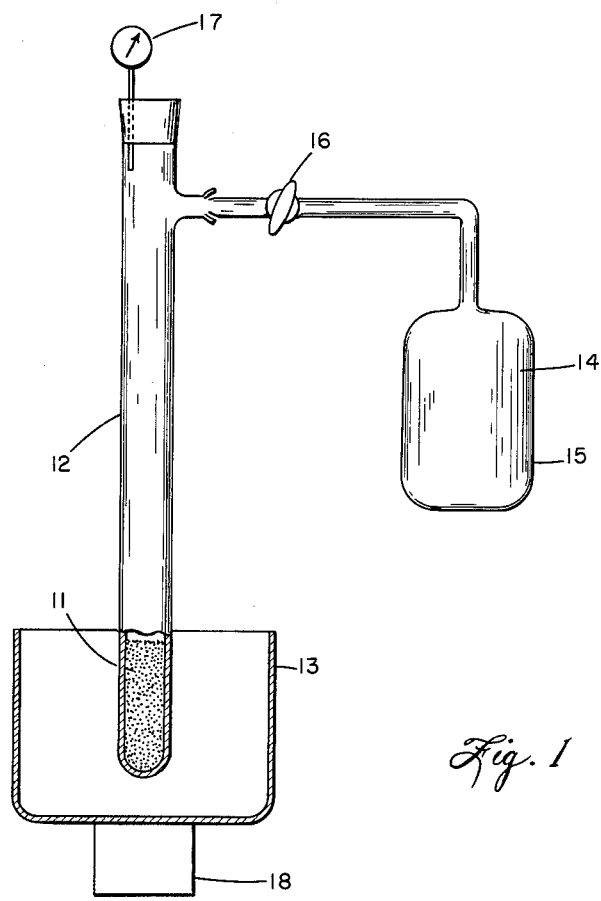
FIG. 1 illustrates apparatus which can be used in carrying out the discovered novel methods.

In general FIG. 1 illustrates my novel apparatus which can be used in employing the novel methods discovered in the course of this invention to ascertain the number of molecules adsorbed on the surface of a solid. Essentially FIG. 1 shows a sample 11 which is located in an evacuated detachable closed sample chamber 12 and cooling means 13 is utilized to maintain the temperature of the sample required by my novel process. A gamma emitting radioactive gas 14 is introduced into the chamber 12 from a gas storage well 15 through valve 16 the gas is allowed to reach the point of adsorption equilibrium with the sample 11. When the pressure in the chamber 12 reaches an adsorption equilibrium (pressure becomes constant) with the adsorption of the gas on the sample equilibrium pressure is measured by a pressure measuring means 17. The pressure ($Po$) of the gas in the system which would have occurred in the chamber providing no adsorption of the gas on the solid whose gas of the sample 11 is calculated from a vapor pressure curve for the specific gas used. The amount of gas adsorbed on the surface of the solid at the point of pressure equilibrium is determined by measuring the degree of gamma ray emission by means of a gamma ray measurement means 18. Pressure and radiolytic measurements are taken at the point of adsorption equilibrium for each increment utilizing quantitatively unmeasured increments of gas added to the system. The various pressure readings and quantitive readings of the amount of gas adsorbed on the surface of the solid are then incorporated into conventional BET equations well known to those skilled in the art and carefully illustrated in the references cited above to calculate the surface area of the solid.

Figure 2:
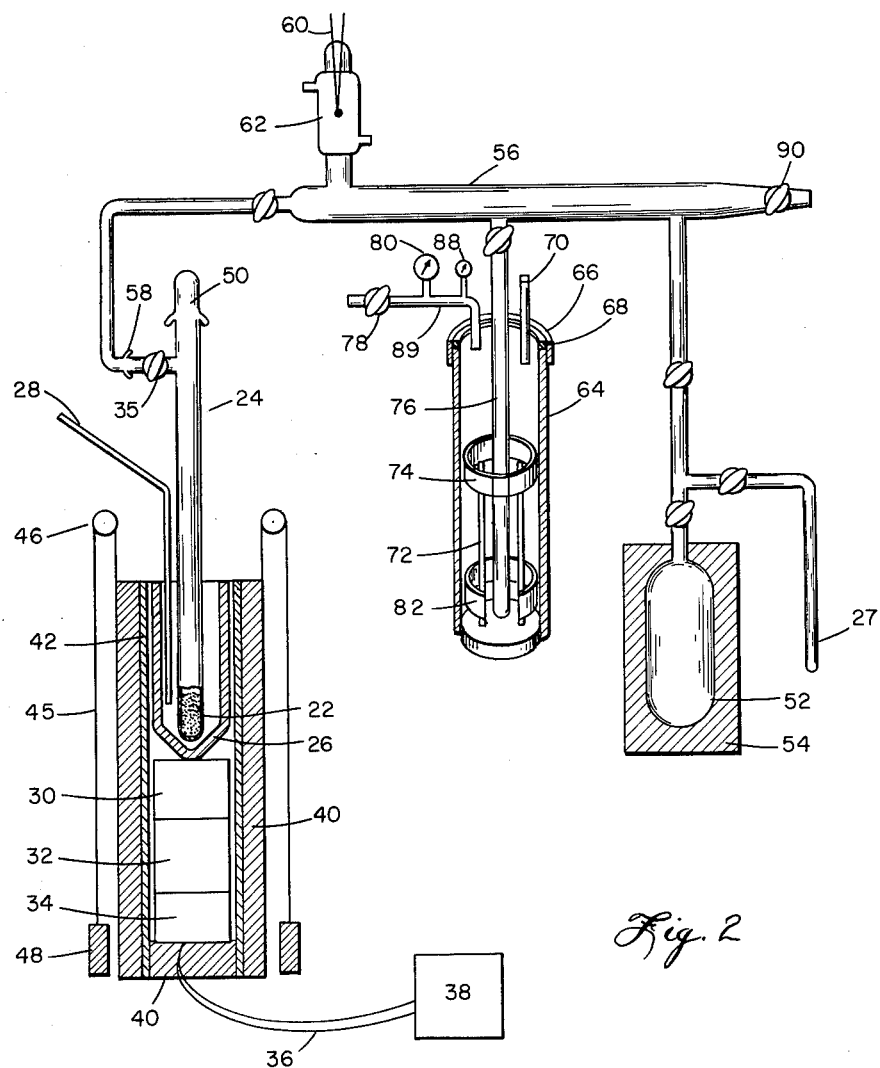
FIG. 2 illustrates a further embodiment of apparatus which may be used to carry out my novel processes.

FIGURE 2 clearly illustrates a novel functional apparatus which may be employed in the practice of my novel process. A known weight of sample solid 22 whose surface area is to be measured is placed in a sample chamber 24 (pyrex or quartz), which chamber is removable from the apparatus in order to permit loading and weighing of the sample, and the sample chamber 24 is positioned in a Dewar flask 26 having a conical base for positioning of the sample chamber therein, the bottom walls of the Dewar flask 26 should be thin to give good gamma ray transmission, a thermometer 28 is positioned in the Dewar flask 26 to permit the temperature of coolant liquid to be taken after the coolant liquid nitrogen or oxygen has been poured into the Dewar flask 26. A scintillation crystal 30 is positioned directly below the conical base of the Dewar flask 26 and the scintillation crystal 30 is mounted above a photomultiplier tube 32, which tube 32 is mounted above a pre-amplifier 34, which is connected to a discriminator and scaler 38 by leads 36. Lead shielding 40 approximately ¼" thick surrounds a brass housing 42 which housing 42 acts as a containment for the gamma ray sensing device and the Dewar flask 26. The lead shielding 40 together with the brass housing 42, and Dewar flask 26 can be raised or lowered by means of wires 45 fixedly mounted on the lead shielding 40 operably connected to pulleys 46 and counterweights 48 by wires 45. This allows one to conveniently insert new sample chambers. A standard taper 50 joint at the top of the sample chamber 24 allows convenient filling of the sample chamber 24.

A pyrex gas storage bulb 52 for storing gamma ray emitting gas, surrounded by ½" lead shielding 54 is connected by means of glass tubing 56 to the sample chamber 24 by means of a detachable flange joint 58. A thermistor type pressure gauge 60 having a pressure measurement sensitivity in the 1–2000 micron pressure range is joined into the glass tubing 56 in order to permit accurate gaseous pressure measurements of the system to be made. A water cooling jacket 62 surrounding the thermistor gauge 60 to enable accurate measurement of the gas pressure in the system is also shown.

A solid nitrogen assembly made up of a stainless steel Dewar 64 having a vacuum sealed cover 66 sealed to the Dewar by means of a Teflon O ring 68. Valve means 70 permits the flow of coolant liquid into the Dewar. An assembly of copper tubes 72 extending ½ way up the inside of the Dewar 64 from the bottom of the Dewar 64 is mounted parallel in a circular ring around the inner part of the Dewar 64 by means of brass collar 74; this allows thermal equilization of the coolant liquid introduced into the Dewar 64. Actually it permits freezing of the entire coolant liquid in the Dewar 64 rather than mere surface freezing. A brass collar 82 prevents the tubes 72 from contacting the bottom of Dewar 64.

A cold finger 76 extending from the glass tubing 56 into the Dewar 64 by means of a sealed part in the cover 66. Valve means 78 connected to a vacuum pump and mounted in the lid 68 controls the rate of pumping of the vapor of the coolant liquid or solid out of the Dewar 64. Pressure gauge means 80 along with the thermocouple 88 mounted in said glass tubing 84 permit accurate pressure and temperature measurements of the coolant liquid or solid in the Dewar 64. The pressure gauge 80 along with the thermocouple 88 can be mounted to the sample chamber 24 by means of glass tubing 89. Valve means 35 permits sealing of the sample tube 24 from the rest of the system and a flanged sealable joint 58 permits separation of the sample tube from glass tubing 56. A valve 90 on glass tubing 56 connected to a high vacuum system permits gas removal from the system.

It is to be understood that my invention is not directed to the use of any specific pressure measurement devices per se, but that any device capable of accurately measuring the amount of pressure in an enclosed vessel such as a thermistor gauge may be employed. Furthermore my invention is not limited to any particular means for measuring the amount of gamma ray emission being given off by the gas which is adsorbed on the surface of the solid. Pressure and gamma ray measuring devices are old and well known in the art and conventional measuring devices may easily be adapted to be used in my invention.

Users of my novel process and apparatus must recognize that indiscriminate use of gamma ray emitting gases can be injurious. The standard shielding and gas recovery apparatus necessary to contain radiation hazards must be employed these are old and well known to those skilled in the art. Thus, while it is possible to utilize a highly concentrated gamma emitting gas in accordance with the practice of my invention, a distinct advantage is gained by using only trace measurable amounts of radioactive isotopes such as the krypton 85 isotope diluted in non-radioactive krypton gas. In actual practice the total amount of krypton 85 in the storage bulb is pumped into the solid nitrogen trap and at this point the highest gamma ray intensity was 3 mr. at the Dewar surface and less than 0.1 at the foot of the Dewar. This represented about 100 times the amount normally used. Thus the shielding around the sample tube is there mostly to reduce the background radiation rather than protect the operator.

The sample chamber in which the solid is kept during the gas adsorption and gamma ray measurement stages of my invention preferably is in the shape of a tube with the solid being maintained at the bottom of the tube. This shape sample chamber is advantageous for several reasons. The amount of gamma ray emission resulting from the gaseous phase of the system surrounding the solid is negligible and can readily be corrected. The thermal regulation of the pressure of the gas surrounding the solid of the solid gas adsorbed thereon is easier to maintain and control by simple means such as immersing that portion of the chamber in liquid nitrogen or oxygen. Of course any conventional means for temperature regulation can be used in the practice of my invention and the broad concept of my invention is to be limited to any particular shape of the sample tube since those skilled can devise other systems employing different cooling, pressure measurement and radiolytic measurement devices and still come within the basic scope of my invention as shown herein.

The following examples are given merely to illustrate my invention and are not to be construed in any way as limiting the scope of my invention.

In carrying out these examples my novel process was employed and the apparatus used was essentially that shown in FIG. 2 and described above. The sample whose surface area was to be measured was inserted into a sample chamber of known weight and the loaded chamber was weighed to determine the weight of the sample. The tube was then heated to 200° C. and evacuated. The tube was then inserted into the Dewar flask and surrounding by liquid nitrogen in the flask. Kryton gas containing known trace measurable amounts of the krypton 85 isotope was bled into the apparatus but was prevented from entering the sample chamber. The pressure of the krypton gas in the system was regulated to between about 300–500 microns by the action of the solid nitrogen assembly on the kryton gas in the cold finger. After pressure regulation had been achieved the krypton gas was then introduced into the sample chamber by opening the valve between the sample chamber and the system.

The amount of krypton gas adsorbed on the solid was then measured by counting on the scaler using the discriminator to eliminate all but the krypton 85 peak. When the count became aproximately constant the cold finger was shut off from the rest of the system by the valve means provided therefore. The pressure of the system was then followed on the system's pressure gauge 60, while at the same time the amount of krypton adsorbed on the solid was followed on the scaler. When the point of adsorption equilibrium (the pressure became constant) was reached the pressure and count rate were recorded. Three additional increments of krypton were added to each sample and the pressure and count rate ascertained for each increment added in order that sufficient data could be obtained for each sample in order to have sufficient data to obtain surface measurements of the samples. The various pressure readings and quantitative readings of the amount of gas adsorbed on the surface of the solid are then incorporated into conventional BET equations well known to those skilled in the art and carefully illustrated in the references cited above. With this data the surface area of the solid was readily ascertained.

The surface area of each sample was also determined by means of the conventional methods given by P. H. Emmett and S. Brunauer in their article published at pages 1558 through 1564 in vol. 59 of the Journal of the American Chemical Society.

The following chart gives both the surface area measurements attained when by novel process was employed as well as the surface area attained when conventional methods were used.

CHART A

*Comparison of surface area measurements use Kr 85 method vs. standard BET nitrogen method*

|  | Graphite (TSX) | Surface Area, m.²/g., 16,700 c./m. per ml. Kr | Radioactive Decay Factor | Surface Area, m.²/g., Kr 85 Method | Surface Area, m.²/g., N₂ BET Method | Percent Variation Kr-N₂ |
|---|---|---|---|---|---|---|
| Example 1 | ⅛″ cubes | 0.435 | 0.987 | 0.429 | 0.421 | +1.9 |
| Example 2 | 20 mesh | 1.018 | 1.000 | 1.018 | 1.00 | 1.8 |
| Example 3 | 40 mesh | 1.59 | 1.000 | 1.59 | 1.47 | 8.1 |
| Example 4 | 80 mesh | 3.43 | 0.989 | 3.46 | 3.27 | 3.4 |
| Example 5 | 80 mesh | 3.45 | .998 | 3.46 | 3.27 | 3.4 |

In order to more clearly illustrate the practice of my invention the actual conversion of data gained in performing Example 5 and its subsequent use in calculating the surface area listed in Chart A above is given in the following chart, which shows that four unmetered increments were sequentially added to the system. In practice the high pressure determination is made first and increments were allowed to evaporate back into the solid nitrogen trap.

| A | B | C | D | E | F | G | H |
|---|---|---|---|---|---|---|---|
| 6,889 | 0.412 | 328 | 2,217 | 0.1480 | 0.8520 | 0.351 | 0.422 |
| 6,580 | 0.394 | 213 | 2,217 | 0.0963 | 0.9037 | 0.356 | 0.270 |
| 6,261 | 0.375 | 124 | 2,207 | 0.0562 | 0.9438 | 0.354 | 0.159 |
| 5,911 | 0.354 | 65 | 2,204 | 0.0297 | 0.9706 | 0.344 | 0.085 |

The figures listed in the various columns are explained as follows:

Column A: Counts per minute for each increment added obtained upon radiolytic measurements made of gas adsorbed on solid after gas has reached the point of adsorption equilibrium with the solid.

Column B: Volume of gas in ml. of gas counted in Column A—this is calculated by dividing the counts per minute by 16,700 which is the number of counts per ml. (STP) for the gas used in performing this example (krypton containing krypton 85 isotope). This figure is represented by the symbol "V" in the equations listed below.

Column C: Pressure of krypton gas in the system given in microns at point of adsorption equilibrium. This figure is represented by the symbol "P" in the equations listed below. When necessary corrections for thermal transpiration are made.

Column D: Calculated vapor pressure of liquid krypton at the temperature of the liquid nitrogen used in the example. This is calculated from a vapor pressure curve for krypton and is represented by the symbol "Po" in the equations listed below.

Column E: ($P/Po$) figure in Column C divided by the corresponding figure in Column D for each incremental addition.

Column F: ($1-P/Po$) for each incremental addition.

Column G: $V(1-P/Po)$ figures Column B multiplied by corresponding figure in column F for each incremental addition.

Column H: $\dfrac{P/Po}{V(1-P/Po)}$

In order to determine the surface area of the sample solid from the data given in B a graph plot of the figures given in Column H $$\dfrac{P/Po}{V(1-P/Po)}$$

against the corresponding figures given in Column E, ($P/Po$), for each increment; a straight line plot was obtained with the line passing directly through 3 of the points formed by the plot and very close to the fourth point. The slope ($m$) of the line plotted was determined to be 2.722 and the intercept ($b$) was determined to be .007.

The volume of a monomolecular film is ($Vm$) was then determined by applying the following formula to the data so obtained $$Vm = (m+b)^{-1} = \dfrac{1}{2.722+.007} = \dfrac{1}{2.73} = 0.366$$

The surface area (S.A.) of the solid sample was then found by use of the following formula $$\text{S.A.} = KVm/W \text{ gr.} = \dfrac{5.21 \times .366}{.522} = 3.45 \text{ m}^2/\text{gr.}$$

wherein W is the weight of the sample in grams and K is constant (5.21 m.²) for krypton gas indicating the number of square meters that a ml. of krypton will cover when adsorbed on a solid. Of course the constant (K) will vary for the individual gas used. The exact figure for the constant K is shown for many gases and in cases where it is not shown it can be readily ascertained by those skilled in the art.

It is readily apparent from a comparison of the data shown in Chart A which shows the measurements of surface area of sample solids obtained when my novel process and apparatus are employed and those obtained when conventional methods are used, that my novel process obtains values which are in close agreement. The results reported here are from early experiments and later experimental values show better self consistency. However these are the only results which were compared directly with $N_2$ measurements. The Kr 85 results are calibrated from absolute standards and an error of 5% can easily be expected in comparing a nitrogen with a krypton surface area. Any differences in the values obtained by the various methods are extremely minimal in view of what is measured and clearly within the range of experimental error. It should be noted at this time that when my novel method and apparatus are employed a time savings factor of significant magnitude is obtained over the time required when conventional methods and apparatus are employed. In the course of performing these examples a 6:1 time saving factor was noted. Thus my invention provides a simple and reliable method of measuring surface areas of solids in a much more rapid manner.

When my invention is employed it eliminates much of the time consuming measurements and precautions required by the prior art methods and apparatus without sacrificing the requisite accuracy required in such measurements. Furthermore my novel method and apparatus can be readily revised to handle multiple samples of solids having a variety of shapes and ingredients without any sacrifice of accuracy.

The amount of krypton adsorbed is measured directly. This is particularly advantageous when small surface areas are involved. The present apparatus can measure $10^{-3}$ ml. of Kr, but this could be increased to several orders of magnitude by increasing the Kr 85 content. Conventional surface area measurement means based on BET equation could not measure particles having a surface area less than 1 m.²/gr. A further advantage of this method is that the measurements can be made much more rapidly than by other methods. One can measure directly the rate of approach to equilibrium and determine when equilibrium is reached.

The amount of Kr adsorbed is measured directly and is not dependent on the amount of material in the remainder of the system. This greatly simplifies the calculations and permits it to be applied to a process control arrangement. For the rapid measurement of the surface area of many samples a group of sample tubes could be equilibrated with Kr at solid $N_2$ temperatures and then transferred to the counting arrangement and the surface area of each measured by a five-minute count.

I claim:

1. A method of ascertaining the number of molecules of a gas required to form a monomolecular film of a gas on the surface of a solid comprising placing a solid in a closed chamber, introducing sequentially into the chamber in at least two increments a gamma ray emitting gas which gas is inert with respect to and adsorbable on the surface of the solid, allowing the gas contained in each incremental introduction to reach the point of adsorption equilibrium with the surface of the solid while maintaining the temperature of said solid and gas adsorbed on the surface of said solid at a temperature such that the normal vapor pressure of the gas in the system is less than one atmosphere, measuring the pressure of the unadsorbed gas in the chamber and radiolytically measuring the amount of gas adsorbed on the surface of the solid after each incremental introduction of gas has reached the point of adsorption equilibrium with the solid and thereafter determining the number of molecules of the gas that would be required to form a monomolecular film of the gas on the surface of the solid.

2. The process of claim 1 wherein said gas is krypton gas containing measurable trace amounts of the krypton 85 isotope.

3. The process of claim 2 wherein the temperature of the solid is maintained at temperature ranging between from about 90° K. to about 70° K.

4. The process of claim 2 wherein at least the first of said increments is an amount less than that which is necessary to form a monomolecular film on the surface of the solid at the point of adsorportion equilibrium.

5. Thep rocess of claim 2 wherein the total amount of all of said increments introduced in the system is sufficient to form a monomolecular film on the surface of the solid at the point of adsorption equilibrium.

6. A method of ascertaining the number of molecules of a gas required to form a monomolecular film of a gas on the surface of a solid comprising placing a solid in a closed chamber, introducing sequentially into the chamber three increments of krypton gas, said gas containing a radiolytically measurable amount of krypton 85 isotope, allowing the gas contained in each increment to reach the point of adsorption equilibrium with the surface of the solid while maintaining the temperature of said solid and gas adsorbed on the surface of said solid at a temperature ranging from between about 90° k. to about 70° k., measuring the pressure of the unadsorbed gas in the chamber and radiolytically measuring the amount of gas adsorbed on the surface of the solid after each incremental introduction gas has reached the point of adsorption equilibrium with the solid, the first of the three increments being of an amount less than the amount necessary to form a monomolecular film on the surface of the solid, at the point of adsorption equilibrium, the total amount of the three increments of gas introduced into the system being sufficient in amount to form at least a monomolecular film on the surface of the solid at the point of adsorption equilibrium, and thereafter determining the number of molecules of the gas that would be required to form a monomolecular film of the gas on the surface of a solid.

References Cited by the Examiner
UNITED STATES PATENTS

| | | | |
|---|---|---|---|
| 3,046,396 | 7/1962 | Lovelock | 250—43.5 |
| 3,091,689 | 5/1963 | Spacil | 250—43.5 |
| 3,116,414 | 12/1963 | Wilson | 250—43.5 |
| 3,117,225 | 1/1964 | Willis | 250—43.5 |

RALPH G. NILSON, *Primary Examiner.*

ARCHIE R. BORCHELT, *Examiner.*